United States Patent [19]

Skorka

[11] Patent Number: 4,823,991
[45] Date of Patent: Apr. 25, 1989

[54] MANUALLY OPERATED DUAL INVERTIBLE PUMP

[75] Inventor: Thomas Skorka, Radolfzell, Fed. Rep. of Germany

[73] Assignee: Ing. Erich Pfeiffer GmbH & Co. KG, Fed. Rep. of Germany

[21] Appl. No.: 850,506

[22] Filed: Apr. 10, 1986

[30] Foreign Application Priority Data

Apr. 16, 1985 [DE] Fed. Rep. of Germany ....... 3513575

[51] Int. Cl.$^4$ .................... B65D 8/02; B67D 5/42; B67D 5/52
[52] U.S. Cl. .................... 222/255; 222/278; 222/321; 222/376; 417/526
[58] Field of Search ............ 222/255, 266, 276, 278, 222/321, 376, 380, 383, 402.19; 239/333, 334, 342; 417/566, 503, 525, 526

[56] References Cited

U.S. PATENT DOCUMENTS

| 211,168 | 1/1879 | Loudon | 417/526 X |
|---|---|---|---|
| 1,470,469 | 10/1923 | Nybakken | 222/255 |
| 1,514,724 | 11/1924 | Pittman | 222/376 |
| 2,765,963 | 10/1956 | Langguth | 222/255 |
| 2,792,974 | 5/1957 | Smith et al. | 222/376 |
| 3,760,986 | 9/1973 | Castner et al. | 222/255 X |
| 4,140,249 | 2/1979 | Majima | 222/321 |
| 4,249,681 | 2/1981 | French | 222/380 |
| 4,277,001 | 7/1987 | Nozawa | 222/376 X |
| 4,371,098 | 2/1983 | Nozawa et al. | 222/321 |

FOREIGN PATENT DOCUMENTS

| 2902624 | 7/1980 | Fed. Rep. of Germany . |
| 2818560 | 9/1982 | Fed. Rep. of Germany . |
| 905088 | 9/1962 | United Kingdom | 417/526 |

OTHER PUBLICATIONS

Search Report for German Appln. P 3513575.1.

Primary Examiner—F. J. Bartuska
Assistant Examiner—Mona C. Beegle
Attorney, Agent, or Firm—Steele, Gould & Fried

[57] ABSTRACT

A manually operated dispensing pump has dual pump mechanisms, one pump being operable in a normal upright position and the other pump being operable when the apparatus is inverted. The dual pumps are fed from the same storage vessel for the media to be pumped. A preferred embodiment arranges the dual pumps successively along the same axis, each having suction ports and valves operable to enable the respective pump when the apparatus is correctly positioned and to seal off the pump when the other pump is enabled.

36 Claims, 5 Drawing Sheets

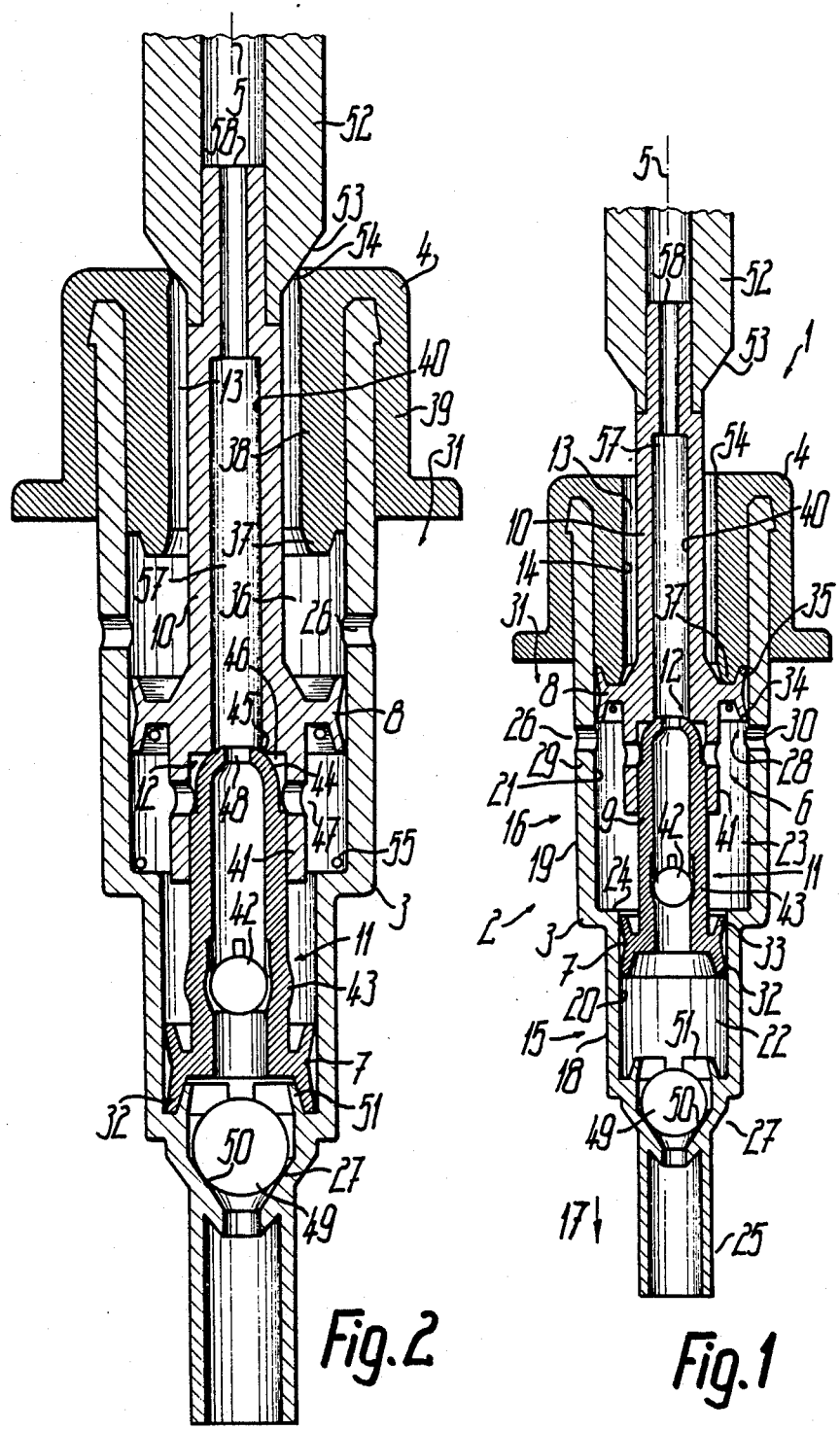

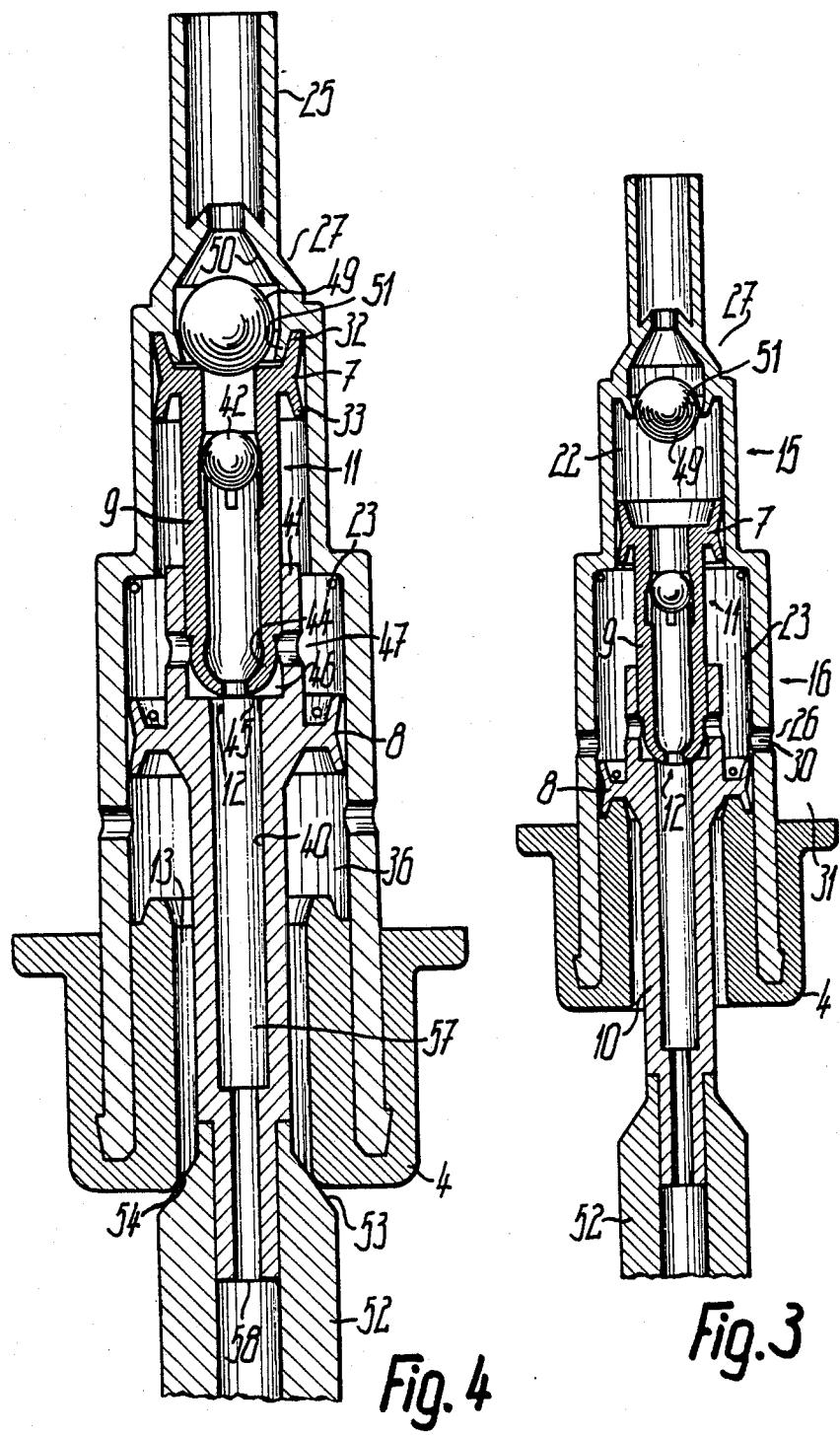

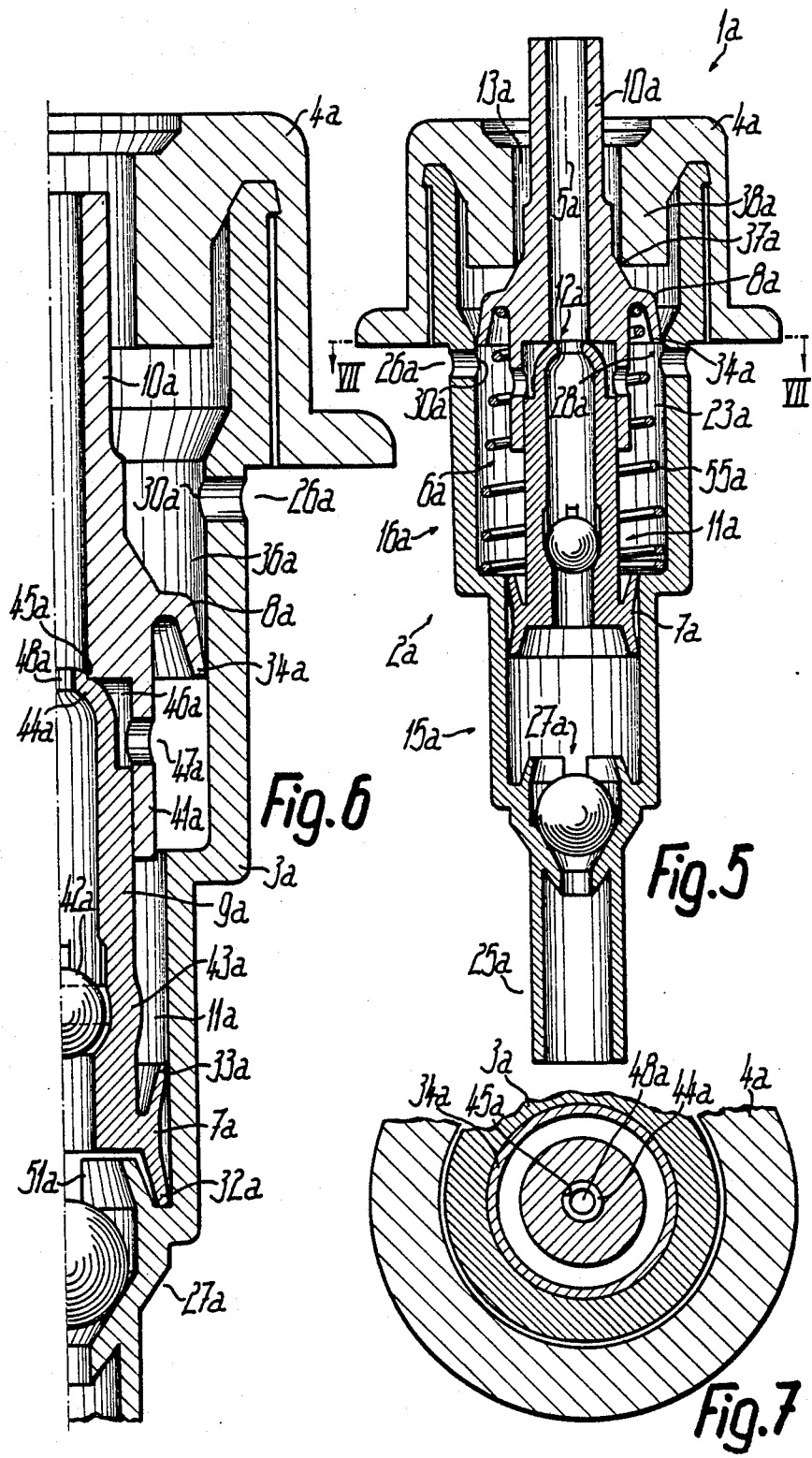

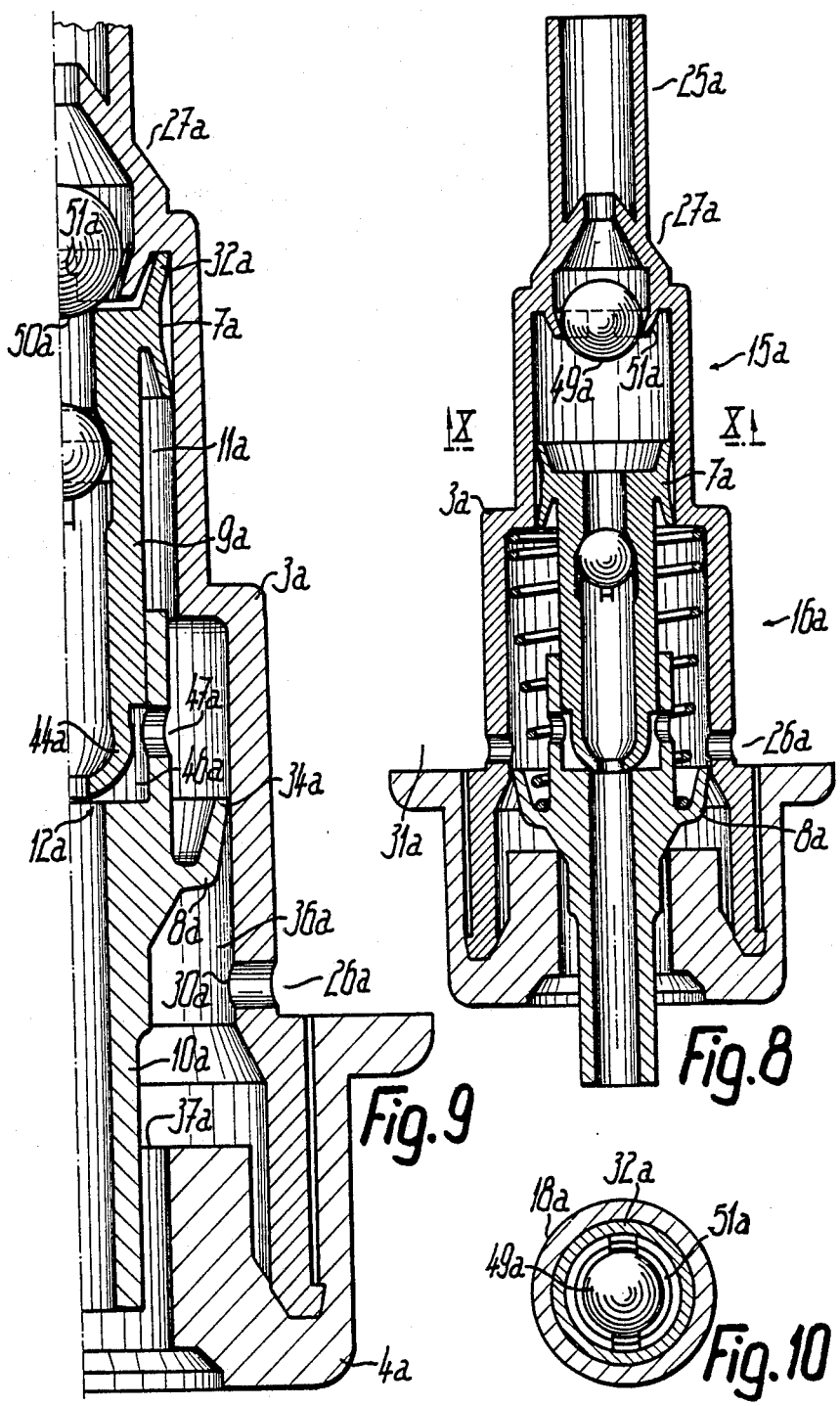

MANUALLY OPERATED DUAL INVERTIBLE PUMP

BACKGROUND OF THE INVENTION

The present invention relates to a manually operated dispensing, distributing or delivery apparatus with a pump for the discharge of media from a storage vessel or the like. The invention operates in a normal or upright position and also in an opposite, inverted position of the apparatus.

A delivery apparatus of this type is known (German Pat. No. 28 18 560), in which a pump chamber defined by a cylinder and a pump piston displaceable therein is filled in the inverted position through an opening in the cylinder wall, whilst in the opposite normal position it is filled through a suction hose provided at the free end of the cylinder. Two check valves are interposed. The latter suction connection must be closed by one of the check valves during the suction stroke to obtain an adequately high suction volume in the inverted position. However, during the pump stroke, said suction connection must be closed both in the normal and in the inverted position. This operation requires a very fine coordination of numerous factors, e.g. the weight of the ball valves, the flow cross-sections and the like. Therefore, satisfactory operation with this delivery apparatus cannot be achieved in both positions, particularly in view of the very small construction of such pumps and differences in manual operation.

SUMMARY OF THE INVENTION

An object of the present invention is to provide a delivery apparatus of the aforementioned type which is able to operate substantially equally well in both positions, and has a simple construction.

According to the invention this object is achieved with a delivery apparatus of the aforementioned type, wherein two pumps are provided. One pump is constructed for operating in the normal position and the other for operating in the inverted position. The two pumps can be connected via suction ports to the same storage vessel and feed into the same outlet passage. Thus, as a separate pump is provided for each position, reciprocal disturbance of the operation of either pump by the other pump is avoided, so that a much more reliable operation is ensured for the particular pump which currently is in use. Nevertheless both pumps can be operated, e.g. simultaneously by means of a single common handle, e.g. a discharge head.

It is conceivable to construct at least one pump as a bellows pump or in accordance with some other pump principle. However, it is particularly appropriate if the apparatus is arranged as a thrust piston pump with a cylinder and a piston unit displaceable therein, with a separate pump piston defining two separate pump chambers of the two pumps. In this manner, a compact construction and high outlet pressures can be achieved and both pumps can be constructed in the same way.

The reservoir or vessel-side openings of the suction ports can be disposed such that when the apparatus is positioned for operation of one pump, the respective ports for the other pump are located above the medium level and therefore are outside the medium. The ports consequently cannot suck in the medium, so that in each position of the apparatus only the suction port of the operative pump has access to the medium. Instead of this or in addition thereto, an advantageous further development of the invention is obtained in that one pump is connected on the inlet side (with an interposed first suction valve) to a first suction port for the normal position, and the other pump is connected (with an interposed second suction valve for the inverted position), to a second suction port. The second suction port preferably leads to the head space surrounding the cylinder, i.e. with the apparatus fitted to that space bounded by the vessel around the pump. Such suction valves make it possible to simply and reliably close the suction port during the pump stroke for the particular pump discharging in that position. For further reduction of interaction between the two pumps, both of them are arranged to issue into the common outlet passage, with reciprocal bypassing on the outlet.

It is conceivable to arrange the pumps in parallel juxtaposed manner, concentrically within one another or in some similar manner. In a very slender construction of the apparatus, reliable operation and simple assembly are particularly ensured if the pumps are more particularly successively arranged along the same axis. In this case, both pump pistons can be provided on a common piston unit instead of on separate piston units and further constructional simplification is achieved in that both pump pistons are positionally fixed in one stroke direction with respect to said piston unit and/or have a fixed reciprocal spacing. The pumps form a fixed component connected to the piston unit and therefore both move together with said piston unit. In order to be able to very simply construct the suction connections to the storage vessel, the particular operative pump is preferably located at the bottom in the associated position of the apparatus.

According to another feature of the invention, the front pump in the direction of flow is sealed with respect to the other pump at its rear end essentially exclusively by the associated pump piston. Thus, with the arrangement wherein the pump piston is fixed in position with respect to the piston unit, in which the front pump piston in the pump stroke direction is not separate from the other pump piston, the pump chamber of the other pump has a smaller piston cross-section. Therefore, assuming an identical stroke of both pump pistons in the rear pump chamber, it is possible to produce an adequately high discharge pressure.

A particularly advantageous further development of the invention consists of the second suction valve for the inverted position being formed by a valve controlled in the manner of a slide valve as a function of the piston position of the associated pump piston. This valve is preferably formed by a connecting opening of the second suction port passing through the cylinder jacket of the second pump chamber and located in the piston path, as well as the second pump piston which clears the connecting opening towards the end of its return stroke to the second pump chamber. Thus, the second suction port can be formed solely by one or more openings in the cylinder jacket, which, following a first partial path of the pump piston on its pump stroke are closed in forcibly controlled manner.

For numerous uses for the apparatus according to the invention, e.g. as an atomizer pump, dosing pump or the like, it is advantageous to only open the outlet passage or the outlet of the particular pump during the pump stroke after the medium in the associated pump chamber has reached a predetermined pressure, so that it can be discharged instantaneously. For this purpose an outlet valve, particularly an elastically closed pressure relief valve is arranged in the outlet passage or discharge connection between at least one pump and the outlet passage. In the case of a very simple embodiment, a separate outlet valve can be associated with each pump. In that case an inner passage passes through the piston unit from the pump chamber for the normal position to an outlet port and said passage can house two successively positioned outlet valves, namely one for each of the two pumps.

According to another embodiment of the invention, an outlet is proposed which is suitable as a pressure relief valve. The gate valve has in at least in one position an approximately arcuate or convex, self-resilient valve body, which cooperates with a preferably annular valve seat and is exposed to pressure from the medium for opening the valve in the area surrounding said seat. Within the valve seat, the valve body can e.g. have a constantly open passage opening and can therefore be part of a passage passing through said valve to which is connected a further passage, with the valve interposed.

In a further embodiment the inner passage is connected via at least one side passage to the pump chamber for the inverted position. In the connection between said side passage and the inner passage is provided an outlet valve constructed in the indicated manner and whose valve body is traversed by the inner passage, i.e. it forms a part of the inner passage. The outlet valve is appropriately provided with an annular valve body engaging in an approximately axial resilient manner on the valve seat, the outlet valve separating the inner channel with respect to the side channel surrounding it. This valve body is more particularly constructed as a spherical cup-shaped hollow part. It can be a separate component or, in a constructionally simple manner, constructed in one piece with a piston rod forming the associated portion of the inner channel.

An outlet valve, particularly the outlet valve for the upright position is, according to a further proposal of the invention, formed by a hose valve, with an elastically widenable hose jacket which e.g. surrounds a spherical valve body. The hose jacket is preferably formed by a longitudinal portion of the jacket of the piston rod of the associated first pump piston. The valve body of the outlet valve for the inverted position can consequently be constructed in one piece with the hose jacket of the outlet valve for the normal upright position, said two valve parts being in turn constructed in one piece with the associated portion of the piston rod and/or the associated pump piston.

For the simple interconnection of the two pump pistons, the pump piston rod for the upright position is inserted in an end socket of the pump piston rod for the inverted position traversed by the side channel. The rod surrounds the outlet valve body for the inverted position with an annular spacing and in the vicinity of the associated valve seat preferably passes into the common outlet passage.

Casing areas located on that side of the associated pump piston on which the piston rod is led outwards for actuation purposes, are preferably vented by a cylinder jacket-like clearance or gap between the piston rod and the pump casing. Appropriately a blocking member is provided on the piston unit and at the end of the pump stroke closes said gap, preferably at the outer end thereof, so that no medium can leak even in the inverted position.

These and other features of the preferred developments of the invention can be gathered from the description and drawings, whereby the individual features can be realized individually or in the form of sub combinations in an embodiment of the invention and in other fields.

BRIEF DESCRIPTION OF THE DRAWINGS

The invention is described in greater detail hereinafter relative to non-limiting embodiments and the attached drawings, wherein show:

FIG. 1 An apparatus according to the invention in axial section and in the initial position.

FIG. 2 The apparatus according to FIG. 1 on a larger scale and at the end of the pump stroke.

FIGS. 3 and 4 The apparatus in representations according to FIGS. 1 and 2, but in the inverted position.

FIGS. 5 and 6 A further embodiment in representations corresponding to FIGS. 1 and 2.

FIG. 7 A section along line VII—VII in FIG. 5.

FIGS. 8 and 9 The apparatus in representations according to FIGS. 5 and 6, but in the inverted position.

FIG. 10 A section along line X—X in FIG. 8.

DETAILED DESCRIPTION OF THE PREFERRED EMBODIMENTS

Figure 11:
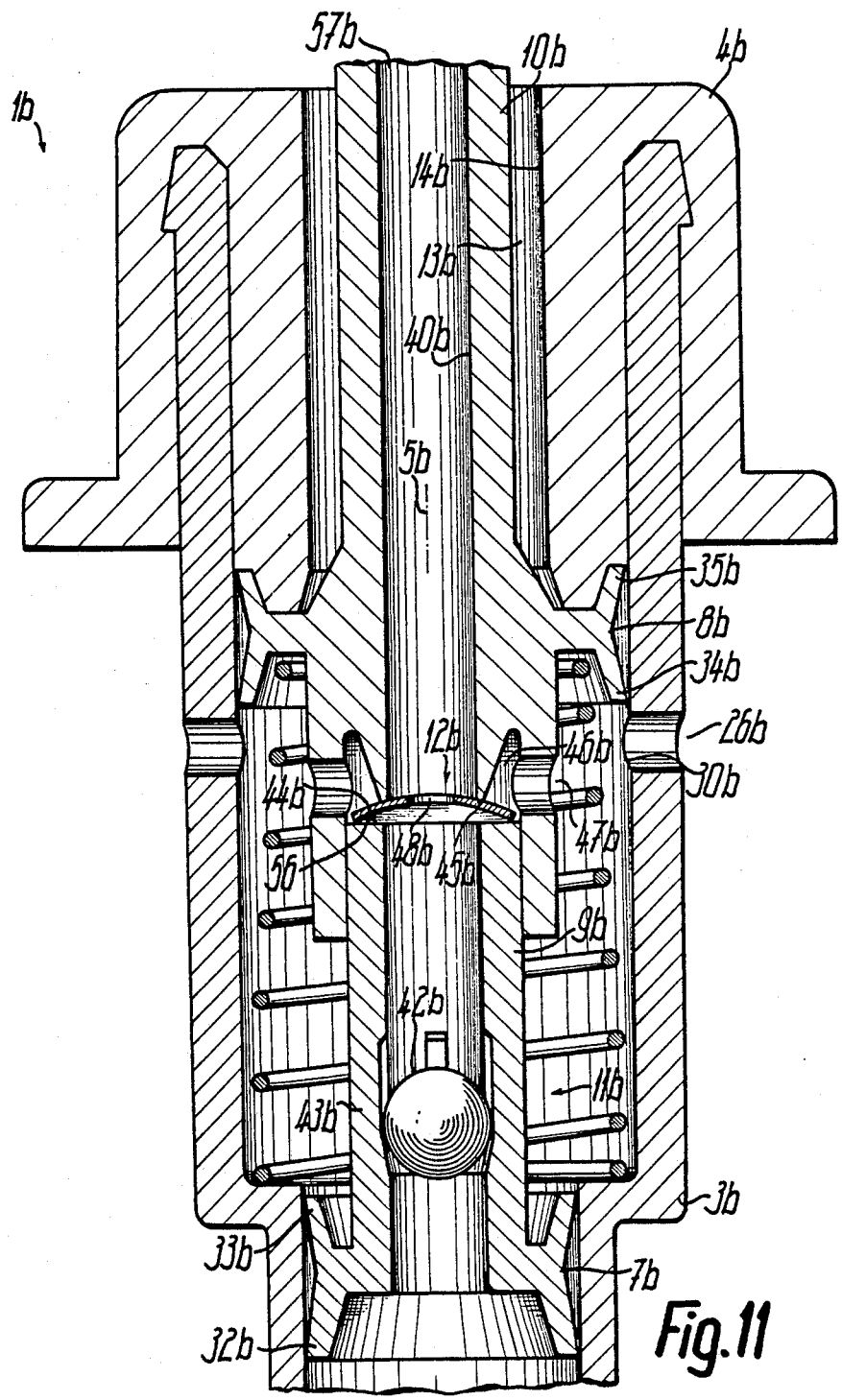
FIG. 11 A detail of a further embodiment of an inventive apparatus in axial section.

As shown in FIGS. 1 to 4 a manually operated delivery apparatus 1 according to the invention has a two-part pump casing 2 comprising a cylinder casing 3 and a cylinder cover 4, which is mounted on the outer wider end of cylinder casing 3 and like the latter is located along pump axis 5. In the pump casing 2 is provided a piston unit 6 linearly displaceable along the pump axis 5 having two pump pistons 7, 8, two piston rods 9, 10 and two outlet valves 11, 12, from which one piston rod 10 is led out of the pump casing 2 for the operation of the pump, leaving free an annular clearance-like venting passage 13 through an opening 14 of cylinder cover 4. The delivery apparatus 1 forms two successively arranged, separate thrust piston pumps 15, 16 in the direction of pump axis 5. The pump 15 at the front in the direction of arrow 17 of the pump stroke and located on the inner end of pump casing 2 is constructed for the upright position shown in FIGS. 1 and 2. The pump 16 behind it or adjacent to the cylinder cover 4 is constructed for the inverted position according to FIGS. 3 and 4. For pump 15, cylinder casing 3 forms a cylinder 18, and a cylinder 19 for pump 16 is disposed directly adjacent. Cylinder 18 forms a piston path 20 for pump piston 7, and cylinder 19 forms a piston path 21 for pump piston 8. With the associated pump piston 7, cylinder 18 defines a pump chamber 22, and cylinder 19 defines a pump chamber 23 with two pump pistons 7, 8 sealing against their respective cylinders during the pump stroke. In order to obtain a greater effective piston cross-section of the pump piston 8 compared with pump piston 7, the internal diameter of cylinder 19 is larger than that of cylinder 18, the two cylinders or piston paths 20, 21, connected via an annular shoulder 24.

Pump 15 has a suction port 25 on pump axis 5, which is connected to the end of pump chamber 22 opposite to pump piston 7 by means of a suction valve 27 constructed as a pressure relief valve. The suction port is e.g. formed by an end connection of cylinder casing 3 having a smaller diameter than cylinder 18 and into which can be inserted a riser (not shown), e.g. a suction hose extending at least approximately to the bottom of the vessel to be emptied with the delivery or dispensing apparatus 1. Suction port 25 connects front pump 15 and rear pump 16 to supply areas for delivering media to said pumps, which can be the same supply area or supply areas connected when upright or when inverted, respectively, in either case leading to the media supply means, i.e., to suction port 25. Suction valve 27, whose valve casing is constructed integrally in one piece with cylinder casing 3, is located along pump axis 5 at the transition between cylinder 18 and the end connection. For pump 16 a suction port 26 is formed by one or more openings in the cylinder jacket 29 of cylinder 19 distributed around axis 5 and can be opened or closed by a suction valve 28. Valve 28 is slide-controlled as a function of the stroke position of pump piston 8. The openings in suction port or passage 26 form connecting openings in the piston path 21. In the initial position of pump piston 8 the connecting openings are located adjacent to the pump piston front end in the direction of the arrow 17, the arrow indicating the pump stroke. At the beginning of the stroke of pump piston 8 the openings are obstructed by the piston moving upwardly (in FIGS. 3 and 4) in pump chamber 23, so that suction port 26 is closed. On the outside of cylinder casing 3, the openings of suction port 26 issue into the head area 31, which is positioned between the cylinder casing 3 projecting into the vessel and the vessel wall surrounding the same. This also defines the vessel opening, to whose boundary is fixed in sealed manner the delivery apparatus 1 with a projecting flange edge of the cylinder cover 4, so that the ventilation of the vessel can substantially exclusively take place via pump casing 2. With the delivery apparatus 1 and therefore the vessel equipped therewith in the inverted position, the head area 31 is filled with the medium to be delivered by gravity and consequently said medium flows through the openings of suction port 26 in head area 31.

The particular pump piston 7 or 8 has two annular piston lips 32, 33 or 34, 35 which project in opposite directions in axial section and which are in each case widened in acute-angled, frustum-like manner towards their terminal edges on their associated piston paths 20, 21. Thus, in the case of an over pressure in pump chamber 22 the contact pressure of the front piston lip 32 of pump piston 7 is increased, while in the case of an over pressure in pump chamber 23 there is an automatic increase in the contact pressure of the rear piston lip 33 of pump piston 7 and the front piston lip 34 of pump piston 8. During the return stroke of piston unit 6, the rear piston lip 35 of pump piston 8 initially closes the connecting openings 30 as it passes over them. This seals off area 36 of pump casing 2 located between pump piston 8 and cylinder cover 4 except for the venting or ventilating passage 13. Consequently after opening again port 26 to area 36 an air compensating connection is achieved between the interior of the vessel and the outer atmosphere. After pump piston 8 with the rear piston lip 35 has closed the connecting openings 30, it must be retracted by a distance corresponding to the path between the running edges of piston lips 34, 35 until the suction port 26 is opened by freeing the connecting openings 30 to pump chamber 23. At the end of the return stroke or in the initial position, the rear piston lip 35 of pump piston 8 engages into an annular clearance of the pump casing 2 adapted to its cross-section, so that the inner end of the annular clearance-like ventilating passage 13 is tightly closed. The inner end of an inner socket 38 of cylinder cover 4, engaging in the outer open end of cylinder casing 3, is provided for this purpose at its end with an annular projection. Projection 37 surrounds the piston rod 10 and is cross-sectionally adapted to the recessed cross-section of the rear end of piston 8. Therefore with the pump unit 6 in the initial position projection 37 engages sealingly into said recessed end and fixes the initial position of piston unit 6 in the manner of a stop. Apart from the innner socket 38, cylinder cover 4 has an approximately equally long outer socket 39 engaging on the outer circumference of cylinder casing 3 with the flange edge for fixing the dispensing apparatus 1 to the vessel. Accordingly the outer end of cylinder casing 3 is completely flush or embedded within cylinder cover 4.

The two piston rods 9, 10, which can also be constructed in one piece, define an inner passage 40 passing from the front end of piston 7 to the outer end of piston rod 10 or piston unit 6, the passage 40 running along the pump axis 5. Piston rod 10 is provided with a sleeve-like end socket 41, located in pump chamber 23, projecting over the front end of pump piston 8 and in which is inserted and thereby fixed in the end of piston rod 9 remote from pump piston 7. Behind the rear piston lip 33 of pump piston 7 is provided in piston rod 9 the outlet valve 11, which is in the form of a hose valve, which can e.g. be constructed according to DE-OS 29 02 624, to which reference should be made for further details or inventive features. Outlet valve 11, which is positioned behind the rear piston lip 33 of pump piston 7, has a valve body 42 formed by a ball, which is located in the associated portion of inner passage 40 and by the engagement on the inner face thereof seals inner passage 40 in medium-sealing manner. Valve body 42 is surrounded by an elastically widenable self-resiliently restoring hose jacket 43, which forms the associated portion of the inner passage 40 and the piston rod 9 and in the represented embodiment is in fact constructed in one piece with the tubular piston rod 9. If the pressure in pump chamber 22 reaches the opening pressure of outlet valve 11, then the hose jacket 43 according to FIG. 2 is widened in such a way that the medium can flow outwards from the pump chamber 22 through the annular clearance between the valve body 42 and the widened hose jacket 43. The over pressure in pump chamber 22 simultaneously acts to axially compress hose jacket 43 via pump piston 7. The piston thereby assists the opening of outlet valve 11 by bulging jacket 43. In this manner a hysteresis action is obtained because the opening pressure of valve 11 is higher than its closing pressure. The result is a uniform discharge from pump chamber 22.

Outlet valve 12, which is located in the vicinity of the front end face of pump piston 8 and serves for the discharge from pump chamber 23, has a hollow cup-shaped valve body 44 located along the valve axis or pump axis 5. Body 44 has a closing face formed by its domed end and has an annular valve seat 45 associated with it, appropriately located along the same axis. The arcuate portion of valve body 44 can pass at its wider end remote from valve seat 45 into a cylindrical sleeve-like portion, whose external diameter is smaller than the surrounding internal diameter of the end socket 41 forming a valve housing. Thus the valve body is surrounded by an annulus 46 on the inlet side from the valve seat 45. This annulus 46, which is closed on the outlet side by the valve body 44 engaging on valve seat 45, forms part of a side passage 47, which connects the inlet side of the outlet valve 12 to the pump chamber 23 and is provided in the jacket of end socket 41 with openings distributed around the pump axis 5 and which connect annulus 46 to pump chamber 23.

When the opening pressure of outlet valve 12 is reached in pump chamber 23, as shown in FIG. 4 the valve body 44 is raised from valve seat 45 under elastic compression by the pressurized medium in annulus 46. The medium can then flow out of pump chamber 23, through the thus-opened outlet valve 12 into the outwardly leading portion of inner passage 40. As a result of the described construction of valve body 44, the latter has a spring characteristic such that its self-resilient restoring or recovery force initially decreases with increasing opening travel. Therefore the discharge from pump chamber 23 can take place all at once with a single valve opening. Valve body 44 is constructed in one piece with piston rod 9 and forms the free end thereof. Furthermore, in the closed position, valve body 44 is traversed at a radial spacing within valve seat 45 by the inner passage 40, and for this purpose in the dome of valve body 44 is provided an e.g. cylindrical opening 48 located in pump axis 5 connecting the interior of piston rod 9 with the remaining inner passage 40 when outlet valve 12 is in the closed position. Thus, on discharge from pump chamber 22, the medium can pass in unhindered manner through outlet valve 12, whereby the medium flowing through the valve body 44 to the outside can reinforce the closing force of outlet valve 12. As from the outlet valve, the inner passage forms the common outlet passage 57 for both pumps 15, 16, whose outlet port 58 is located on the outer end of the piston unit.

Suction valve 27 is constructed as a check valve provided with a ball as its valve body and having a valve seat formed by an inner cone, which is tapered towards the suction port 25. At the end remote from valve seat 50, stops are provided for the valve body 49 in the form of a cage 51 permeable to the medium and on which the body 49 engages when the suction valve 27 is in the open position according to FIG. 3. The annular cage 51 is interrupted by open slots and is cross-sectionally constructed in such a way that at the end of the pump stroke it is substantially completely located within the recessed front end of the pump piston 7 or engages in the front piston lip 32 such that it engages on its frustum-shaped inner circumferential surface.

On the portion of the piston unit 6 or piston rod 10 located outside pump housing 2, a blocking member 52 is provided for the through-opening 14 or the ventilating passage 13 and is provided with a blocking cone 53 tapered in acute-angled, frustum-shaped manner towards the pump housing 2. At the end of the pump stroke, according to FIGS. 2 and 4, cone 53 engages on the edge 54 of opening 14 of cylinder cover 4, so that the associated end of ventilating passage 13 is tightly closed. The blocking member 52 can be mounted in sleeve-like manner on the outer end of piston rod 10 and can be part of its discharge head for actuating the delivery apparatus 1. The annular boundary 54 is appropriately cross-sectionally rounded.

The described pump functions in accordance with the following process. In the normal position according to FIGS. 1 and 2, in which the delivery apparatus 1 rests on the top of the vessel to be emptied, e.g. with an approximately vertical pump axis 5, medium is sucked from the bottom of the vessel into pump chamber 22 and opens suction valve 27 during the return stroke of piston unit 6. Medium does not flow through suction port 26 in this case, so that pump chamber 23 is not filled with medium. During the following pump stroke the suction valve 27 closes and after reaching the opening pressure, outlet valve 11 opens, so that medium can be discharged to the outside from pump chamber 22 through opening 48 and inner passage 40. In the inverted position according to FIGS. 3 and 4, in which the delivery apparatus 1 is positioned with an upright or approximately vertical pump axis 5 on the underside of the vessel, a vacuum is built up in pump chamber 23 during the return stroke and after pump piston 8 has passed over connecting openings 30 this leads to the suction of medium through suction port 26 into pump chamber 23. During the following pump stroke on reaching the opening pressure of outlet valve 12, the medium is discharged from pump chamber 23 through side passage 47, outlet valve 12 and inner passage 40. Through gravity the valve body 49 of suction valve 27 is then in the open position, where it is held by cage 51. Any medium or air which may be located in pump chamber 22 can be forced back into the vessel by pump piston 7 through suction port 25, so that in this case the suction valve 27 with suction port 25 forms a venting passage for pump 15. Independent of the position of delivery apparatus 1 following the initial phase of the pump stroke, i.e. after the pump piston 8 has passed over the connecting openings 30, air compensation relieving suction inside the vessel can take place. The return stroke of piston unit 6 takes place under the tension of a recovery spring 55, which in the represented embodiment is arranged within the pump chamber 23, e.g. in the form of a helical compression spring surrounding piston rod 9 and end socket 41. One end of the spring is supported in the front, recessed end of the pump piston 8 and the other end is supported on annular shoulder 24, close to which the rear piston end of pump piston 7 disposed when is in the initial position.

In FIGS. 5 to 11 the same reference numerals as in FIGS. 1 to 4 are used for corresponding parts, but in FIGS. 5 to 10 the letter "a" is added and in FIG. 11 the letter "b". In the embodiment according to FIGS. 5 to 10 piston 8a of pump 16a only has one piston lip, namely the front piston lip 34a. Thus, at the start of the pump stroke, the connecting openings 30a of suction port 26a are freed to the area 36a of pump casing 2a located behind pump piston 8a as soon as the sealing lip 34a passes over the same. During the return stroke as the lip 34a passes opening 30, said connecting openings 30a are closed off from area 36a simultaneously with opening these openings 30a with respect to pump chamber 23a. An outwardly tapered, frustum-shaped shoulder of piston rod 10a is connected to the rear end of piston 8a and when the piston unit 6a is in the initial position it engages under the pressure of restoring spring 55a in sealing manner on the inner ring boundary edge 37a of inner socket 38a of cylinder cover 4a.

In the embodiment of FIG. 11, the body 44b of outlet valve 12b is formed by a spring washer-like, separate component made from plastic, steel or the like, which is self-resiliently axially braced between an end face 56 and a valve seat 45b when the valve is in the closed position. The concave curved side of the annular spring washer sealingly engages in annular manner on end face 56 in the vicinity of its outer circumference. The engagement of the spring washer on valve seat 45b takes place over a smaller diameter, but this diameter is larger than the opening 48b. It is also conceivable for valve body 44b not to be curved in the closed position and for it to instead be approximately planar, assuming a curved shape in the open position. Valve body 44b is axially braced between the annular end face 56 and the valve seat 45b. On its convex curve side valve body 44b is surrounded by annulus 46b following on to the outer circumference of valve seat 45b and this forms part of the side passage 47b. The external diameter of valve body 44b is only slightly smaller than the internal diameter of annulus 46b, so that the valve body 44b retains a precisely aligned position and can nevertheless perform in unhindered manner its resilient opening movement.

What is claimed is:

1. A manually operated dispenser (1) for dispensing media from a media supply means, said dispenser comprising:
    pump means (15, 16) providing two pumps (15, 16) having pump chambers (22, 23),
    a first one (15) of said two pumps being provided for operation in an upright position of the dispenser,
    a second one (16) of said two pumps being provided for operation in an inverted position of said dispenser,
    suction ports (25, 26) connecting said pumps (15, 16) to said media supply means,
    outlet duct means (57) discharging the media from said pump chambers (22, 23), said outlet duct means (57) being connected to said pump chambers (22, 23), and
    wherein said outlet duct means has a common outlet duct (57) for said two pumps (15, 16), said common outlet duct (57) traversing one of said pumps.

2. A dispenser according to claim 1, wherein each of said pumps (15, 16) issues into the common outlet duct (57) by bypassing the respective other one of said pumps (16, 15).

3. A dispenser according to claim 1, wherein the two pumps are arranged along a common axis.

4. A dispenser according to claim 1, wherein the two pumps are arranged axially one behind the other.

5. A dispenser according to claim 1, wherein said supply means is provided by a storage chamber for the media, said storage chamber defining supply areas for supplying the media from the same said storage chamber as well in the upright position as in the inverted position, said two pumps (15, 16) being constructed to feed the media from a respective one of said supply areas into the outlet duct (57), one of said suction ports (25, 26) being connected to one of said supply areas in the upright position and another (26) of said suction ports being connected to another (31) of said supply areas in the inverted position, said another (31) of said supply areas being located around the cylinder (18, 19).

6. A dispenser according to claim 1, wherein an inlet valve (27, 28) is interposed between at least one pump (15, 16) and an associated suction port (25, 26).

7. A dispenser according to claim 6, wherein the inlet valve for the inverted position is a slide controlled valve, said inlet valve being controlled as a function of position of an associated pump piston.

8. A dispenser according to claim 7, wherein the inlet valve for the inverted position of the apparatus is formed by a connecting opening penetrating in an associated piston path of the cylinder for the corresponding pump piston, a cylinder jacket bounding said cylinder being traversed by the second suction port to form the connecting opening, said inlet pump piston thereby opening the connecting opening to the associated one of the pump chambers towards an end of a return stroke.

9. A dispenser according to claim 1, wherein an outlet valve of said outlet duct has an arcuate self-resilient valve body cooperating with a valve seat, said valve body opening the valve as a function of a pressure of the media at an area surrounding the valve seat.

10. A dispenser according to claim 9, wherein the valve seat is annular.

11. A dispenser according to claim 9, wherein said valve body is constructed as a substantially spherical cup-shaped hollow body.

12. A dispenser according to claim 1, wherein said pump means (15, 16) comprises a thrust piston pump (15, 16) having a cylinder (18, 19) and a piston unit (6) displaceable along piston paths (20, 21) of said cylinder (18, 19) in two opposite stroke directions, said piston unit (6) having separate pump pistons (7, 8) for defining two separate pump chambers (22, 23) of the two pumps (15, 16), whereof a first one (22) of said pump chambers (22, 23) is connected to a first one (25) of said suction ports (25, 26) provided for the upright position and whereof a second one (23) of said pump chambers (22, 23) is connected to a second one (26) of said suction ports (25, 26) provided for the inverted position, said common outlet duct traversing one of said pump chambers.

13. A dispenser according to claim 12, wherein two pump pistons of both said pumps are provided on a common piston unit and displaceable in a common pump stroke, said piston unit having at least one piston rod.

14. A dispenser according to claim 12, wherein the two pump pistons are provided in positionally fixed manner with respect to the piston unit in one of said stroke directions.

15. A dispenser according to claim 12, wherein the two pump pistons are provided with a fixed spacing between them.

16. A dispenser according to claim 12, wherein the pump chamber of the respective pump in operation is located below the pump chamber of the respective other pump.

17. A dispenser according to claim 1, wherein each pump is connected to the outlet duct (57) via a discharge connection, an outlet valve being arranged in the discharge connection between at least one pump and the outlet passage.

18. A dispenser according to claim 17, wherein at least one of said outlet valves is an elastically closed pressure relief valve.

19. A dispenser according to claim 17, wherein an outlet valve for the upright position is formed by a hose valve.

20. A dispenser according to claim 19, wherein the hose valve comprises an elastically widenable hose jacket surrounding a valve body.

21. A dispenser according to claim 20, wherein said valve body is spherical.

22. A manually operated dispenser (1) for dispensing media from a media supply means, said dispenser comprising:
    pump means (15, 16) providing two pumps (15, 16) having pump chambers (22, 23),
    a first one (15) of said two pumps being provided for operation in an upright position of the dispenser, a second one (16) of said two pumps being provided for operation in an inverted position of the dispenser, suction ports (25, 26) for connecting said pumps (15, 16) to said media supply means, outlet duct means (57) for discharging the media from said pump chambers (22, 23), said outlet duct means (57) being connected to said pump chambers (22, 23), and wherein one pump is a front pump (15) located in front of the other pump forming a rear pump (16), the pump chamber (22) of the front pump (15) being sealed at a rear end substantially by an associated pump piston (7) with respect to the pump chamber (23) of the rear pump (16).

23. A dispenser according to claim 22, wherein the rear pump has a larger piston cross-section than the front pump.

24. A manually operated dispenser (1) for dispensing media from a media supply means, said dispenser comprising:

pump means (15, 16) providing two pumps (15, 16) having pump chambers (22, 23), a first one (15) of said two pumps being provided for operation in an upright position of the dispenser, a second one (16) of said pumps being provided for operation in an inverted position of the dispenser, suction ports (25, 26) for connecting said pumps (15, 16) to said media supply means, outlet duct means (57) for discharging the media from said pump chambers (22, 23), said outlet duct means (57) being connected to said pump chambers (22, 23), and wherein said two pumps are piston pumps (15, 16) having a piston unit (6) displaceable in a cylinder (18, 19), said piston unit (6) being traversed by a common outlet duct (57) for said two piston pumps (15, 16), said outlet duct (57) connecting the pump chamber (22) for the upright position to an outlet opening.

25. A dispenser according to claim 24, wherein the two outlet valves are arranged one behind the other in said outlet duct of said piston unit.

26. A dispenser according to claim 24, wherein the inner passage of said piston unit is connected by means of at least one side passage to the pump chamber for the inverted position.

27. A dispenser according to claim 21, wherein the outlet valve for the inverted position has a valve body substantially axially resiliently engaging in annular manner on a valve seat, said outlet valve being traversed by the inner passage, thereby separating the inner passage from the surrounding side passage.

28. A dispenser according to claim 26, wherein the piston rod of the pump piston for the upright position is inserted in an end socket of the pump piston rod for the inverted position, said end socket spacedly surrounding the valve body of the outlet valve for the inverted position, said end socket being traversed by the side passage.

29. A dispenser according to claim 28, wherein said end socket passes into the common outlet passage in the vicinity of the valve seat of the outlet valve for the inverted position.

30. A manually operated dispenser (1) for dispensing media from a media supply means, said dispenser comprising:

pump means (15, 16) providing two pumps (15, 16) having pump chambers (22, 23), a first one (15) of said two pumps being provided for operation in an upright position of the dispenser, a second one (16) of said two pumps being provided for operation in an inverted position of the dispenser, suction ports (25, 26) for connecting said pumps (15, 16) to said media supply means, outlet duct means (57) for discharging the media from said pump chambers (22, 23) said outlet duct means (57) being connected to said pump chambers (22, 23), and wherein said two pumps are piston pumps (15, 16) having a piston unit (6) displaceable in a cylinder (18, 19) with an outlet valve (12) having a valve body (44), the outlet valve being associated with a common outlet duct, (57) for both piston pumps, said valve body (44) being integral with at least part of a piston rod (9, 10) of said piston unit (6), said piston rod (9, 10) forming an associated portion of an inner passage providing the common outlet duct (57) and connecting the pump chamber (22) for the upright position to an outlet opening.

31. A manually operated dispenser (1) for dispensing media from a media supply means, said dispenser comprising:

pump means (15, 16) providing two pumps (15, 16) having pump chambers (22, 23), a first one (15) of said two pumps being provided for operation in an upright position of the dispenser, a second one (16) of said two pumps being provided for operation in an inverted position of the dispenser, suction ports (25, 26) for connection said pump (15, 16) to said media supply means, outlet duct means (57) for discharging the media from said pumping chamber (22, 23) said outlet duct means (57) being connected to said pumping chambers (22, 23), and wherein said two pumps (15, 16) are piston pumps having a piston unit (6) displaceable in a cylinder (18, 19) by at least one piston rod (9, 10), at least one pump (15) being connected to the outlet duct (57) via an outlet valve formed by a hose valve for the upright position and comprising an elastically widenable hose jacket (43) surrounding a valve body, said piston rod (9, 10) being hollow, said hose jacket (43) being formed by a longitudinal portion of the hollow piston rod (9, 10) of an associated pump piston (7) for the upright position.

32. A manually operated dispenser (1) for dispensing media from a media supply means, said dispenser comprising:

pump means (15, 16) providing two pumps (15, 16) having pump chambers (22, 23), a first one (15) of said two pumps being provided for operation in an upright position of the dispenser, a second one (16) of said two pumps being provided for operation in an inverted position of said dispenser, suction ports (25, 26) connecting said pumps (15, 16) to said media supply means, outlet duct means (57) discharging the media from said pump chambers (22, 23), said outlet duct means (57) being connected to said pump chambers (22, 23), and wherein said two pumps are piston pumps (15, 16) having a piston unit (6) comprising two pump pistons (7, 8) displaceable in cylinders (18, 19), at least one of said pump pistons (7, 8) having oppositely directed piston lips (32, 33, 34, 35) for engagement on an associated piston path (20, 21) of a common cylinder (18, 19).

33. A manually operated dispenser (1) for dispensing media from a media supply means, said dispenser comprising:

pump means (15, 16) providing two pumps (15, 16) having pump chambers (22, 23), a first one (15) of said two pumps being provided for operation in an upright position of the dispenser, a second one (16) of said two pumps being provided for operation in an inverted position of said dispenser, suction ports (25, 26) connecting said pumps (15, 16) to said media supply means, outlet duct means (57) discharging the media from said pump chambers (22, 23), said outlet duct means (57) being connected to said pump chambers (22, 23), and wherein said two pumps are piston pumps (15, 16) having a piston unit (6) displaceable in a cylinder (18, 19) and having a rear end, a gap being provided between the rear end of the piston unit (6) and a passage opening provided for passing the piston unit through an outer cylinder cover means (4), said gap leading from an interior of the dispenser (1) to outside and being closed by a closing member (53) at least at an end of the pump stroke of the piston unit (6).

34. A dispenser according to claim 33, wherein said gap is provided as a ventilating passage for said dispenser.

35. A dispenser according to claim 33, wherein said closing member is provided on a rear piston rod of the pump piston for the inverted position, said closing member being located outside of the cylinder cover means, said closing member engaging an outer ring boundary of the passage opening at the end of the pump stroke, thereby closing the passage opening.

36. A dispenser according to claim 33, wherein said closing member is a closing cone.

* * * * *